Jan. 24, 1961  G. HIRS  2,969,148
FILTER APPARATUS
Filed Jan. 18, 1957  6 Sheets-Sheet 1

Fig. 1

INVENTOR.
GENE HIRS.
BY
Wallace P. Lamb
ATTORNEY.

INVENTOR.
GENE HIRS.
BY
Wallace P. Lamb
ATTORNEY.

Jan. 24, 1961  G. HIRS  2,969,148
FILTER APPARATUS
Filed Jan. 18, 1957  6 Sheets-Sheet 3

INVENTOR.
GENE HIRS.
BY
Wallace P. Lamb
ATTORNEY.

Jan. 24, 1961  G. HIRS  2,969,148
FILTER APPARATUS
Filed Jan. 18, 1957  6 Sheets-Sheet 5

INVENTOR.
GENE HIRS.
BY Wallace P. Lamb
ATTORNEY.

United States Patent Office 2,969,148
Patented Jan. 24, 1961

2,969,148

FILTER APPARATUS

Gene Hirs, 17208 Greenview Road, Detroit, Mich.

Filed Jan. 18, 1957, Ser. No. 634,962

4 Claims. (Cl. 210—108)

This invention relates generally to fluid filter apparatus and particularly to automatically cleaned filter apparatus.

It is the principal object of my invention to provide an improved fluid filter apparatus having both fine filtering and high filtering capacity for a relatively small apparatus.

Another object of the invention is to provide an improved fluid filter apparatus in which a decrease in the filtering rate, such as by clogging of the filter medium by foreign matter, initiates a controlled cycle of automatic operations including cleaning of the filter medium, removal of the foreign matter, and return to normal filtering operation.

Another object of the invention is to provide an improved filter apparatus having an automatically operable cleaning system in which cleaning of the filter medium and removal of the foreign matter is effected by a reverse flow of pressurized fluid through the filter medium.

Another object of the invention is to provide a filter apparatus of the above mentioned character in which reverse flow and rapid evacuation of liquid from the filter is effected by the introduction of an extraneous fluid under high pressure on the outlet side of the filter medium.

Another object of the invention resides in an improved filter apparatus having two filter mediums of which one filters fluid of foreign matter and is periodically and automatically cleaned by a pressurized reverse flow of fluid therethrough and of which the other is in the path of reverse flow to filter the fluid and remove the foreign matter.

A further object of the invention is to provide an improved filter to filter fluid and to provide for reverse flow cleaning of the filter medium.

A still further object is to provide an improved filter head construction.

Other objects of the invention will become apparent from the following detail description, taken in connection with the accompanying drawings in which.

Referring to the drawings by characters of reference, my fluid filtering apparatus comprises, in general, a support or standard 20, a filter 22, a fluid supply and pressure means or pump 24, and a filter medium replacement and foreign matter disposal machine or conveyor 26. In addition to the above units, my apparatus is provided with a control system hereinafter described, in which control devices cooperate to control filtering, effect automatic cleaning of the filter, removal of the foreign matter, and return of the apparatus to filtering operation.

In the present arrangement of the units of the apparatus, both the filter 22 and the conveyor 26 are mounted on the standard 20 with the filter preferably being located directly above the conveyor. The pump 24 may be arranged in any location suitable for supplying contaminated fluid to the filter 22.

Any suitable standard may be used, the present standard 20 being a frame structure comprising four spaced uprights 28 and several cross members 30. These members may be welded, or be otherwise rigidly secured together.

The filter 22 comprises generally a head 32, a filter medium 34, and a second filter medium 36. In arrangement, the filter medium 34 and the filter medium 36 are in spaced relation within the head 32, dividing the interior thereof into an intermediate filter chamber 38, an upper clean fluid outlet chamber 40, and a lower outlet chamber 42. The filter chamber 38 has an inlet 44 for contaminated fluid and the outlet chamber 40 an outlet 46, and normally, i.e., during filtering operation, fluid under pressure in chamber 38 flows through filter medium 34 into chamber 40 and out of the outlet 46. In order to provide for cleaning of the filter medium 34 when it becomes inefficient through clogging, I provide an inlet 48 into chamber 40 for the introduction of a pressurized fluid, such as compressed air which effects a reverse flow through head 32, dislodging dirt and other foreign particles from the filter medium 34 and depositing them on the lower filter medium 36, the fluid being discharged from the head through an outlet 50 in the lower chamber 42. It should be understood at this point, that during filtering, the inlet 44 and outlet 46 are open and inlet 48 and outlet 50 are closed and that the reverse is the case during the cleaning operation.

The filter medium 34 is a fine textured medium which may be made of any suitable material, such as a closely woven fabric, preferably a plastic material fabric for durability. The second filter medium 36 may be less fine than the first and may be a paper filter preferably in strip form.

Any suitable pump may be used to deliver contaminated fluid to the filter 22, the pump 24 selected to have a capacity sufficient to maintain the fluid under a high pressure in filter 22 to obtain force filtering and resultant high filtering capacity.

Where my filtering apparatus is employed to filter liquids that are to be reused, such as for example, coolants and fine cutting oils for machine tool cooling and cutting purposes, it is desirable to have a storage tank 52 for the contaminated liquid and also a storage tank 54 for the filtered or clean liquid. The pump 24, driven by an electric motor 56, delivers liquid from tank 52 to the filter inlet 44 through a supply pipe 58 and clean liquid flows from the filter outlet 46 through a pipe 60 to the clean liquid storage tank 54. A second pump 62 driven by an electric motor 64 may be employed to deliver clean liquid from tank 54 to one or more points of use of the liquid.

Referring now in detail to the construction of the filter head 32, this head comprises two separable body sections or shells 66 and 68, and a removable section or manifold 70. Preferably shell 66 is the stationary shell and positioned between the uprights 28 may be welded or be otherwise rigidly secured thereto, the uprights being spaced from the shell by spacers 72 to allow clearance for the conveyor 26. Shell 66 is an open ended structure having its upper end closed by the manifold 70 and its lower end normally closed by the movable shell 68. Bolts 74 may be used to secure the manifold 70 and shell 66 together and attached respectively to flanges on the manifold 70 and shell 66 are mating gaskets 76 to insure a fluid tight joint. Also mating gaskets 78 are respectively attached to the opposed ends of shells 66 and 68 to insure a fluid tight joint therebetween. The upper filter medium 34 extends between the shell 66 and manifold 70 having outer marginal portions 80 held and sealed between the gaskets 76. Similarly, the paper filter 36 extends between the separable shells 66 and 68 and is sealed around the periphery of the shells by the gaskets 78.

In the interests of economy of manufacture, the shells 66, 68 and the manifold 70 may be fabricated units of rectangular cross section. To this end, the shell 66 has a structural frame including opposite end frames 82 and 84 formed by channel members and extending between the end frames are angle members 86 forming the corners of the shell. To the outside of this frame structure is secured plates 88 that form the four side walls and the frames, angle members and plates are welded together to provide a rigid shell that will withstand high internal pressures. In the construction of the manifold 70, webs 90 of channel members form the manifold sides and a plate 92, welded to the upper flanges of the channel members forms the top wall of the manifold. A fluid flow restricting manifold plate 94 is welded to the bottom flanges of the manifold and separates the manifold from the shell 66. In the plate 94 is a plurality of slot-like apertures 96 therethrough providing communication between shell 66 and manifold 70. Within the manifold 70 are upright, spaced apart partitions or plates 98 which divide the interior of the manifold 70 or chamber 40 into a plurality of compartments 100 which are in communication through apertures 101 in plates 98. The plates 98 function as baffles to keep the manifold filled with fluid, prevent surge, and reinforce the manifold. As to the construction of shell 68, the sides 102 thereof may be formed by the webs of channel members and a bottom 104 may be provided by welding a plate to the bottom flanges of the channel members. The upper flanges of the channel members provides a seat 108 for the gaskets 78 and for screening 110 which rests on and is attached to the flanges around the shell periphery. A grating 112 supports the screening 110 and is secured to the shell 68 on angle supports 114. The screening 110 and grating 112 give support to the filter paper 36 over the wide area of the opening of shell 68.

In order to provide a filter having both fine filtering and high filtering capacity, I make the filter medium 34 in the shape of a plurality of spaced bags 116 that collectively present a filter medium area larger than the cross sectional area of the filter chamber 38. The filter medium 34 is made by pleating a length of filter medium fabric in a sinuous shape to form the sides and bottoms of the bags 116 and sewing the corresponding side edges of the loops together, as at 118, to close the ends of the bags. To the loops at the tops of the bags 116 is sewn strips of the filter medium material to connect the loops together and to provide the flange 80 that is held between gaskets 76.

Figure 6:
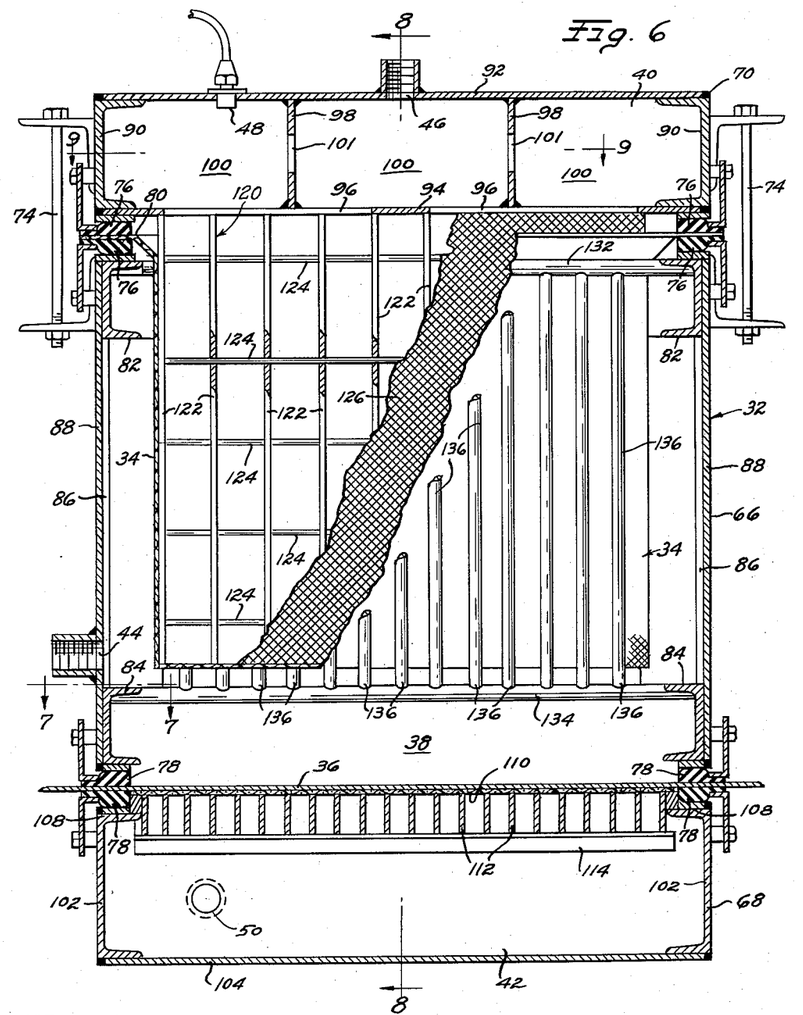
Fig. 6 is a vertical sectional view, taken substantially along line 6—6 of Fig. 2.
Figure 7:
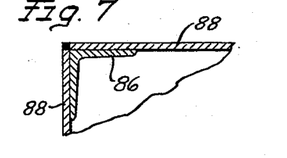
Fig. 7 is a horizontal sectional view, taken substantially along line 7—7 of Fig. 6.
Figure 8:
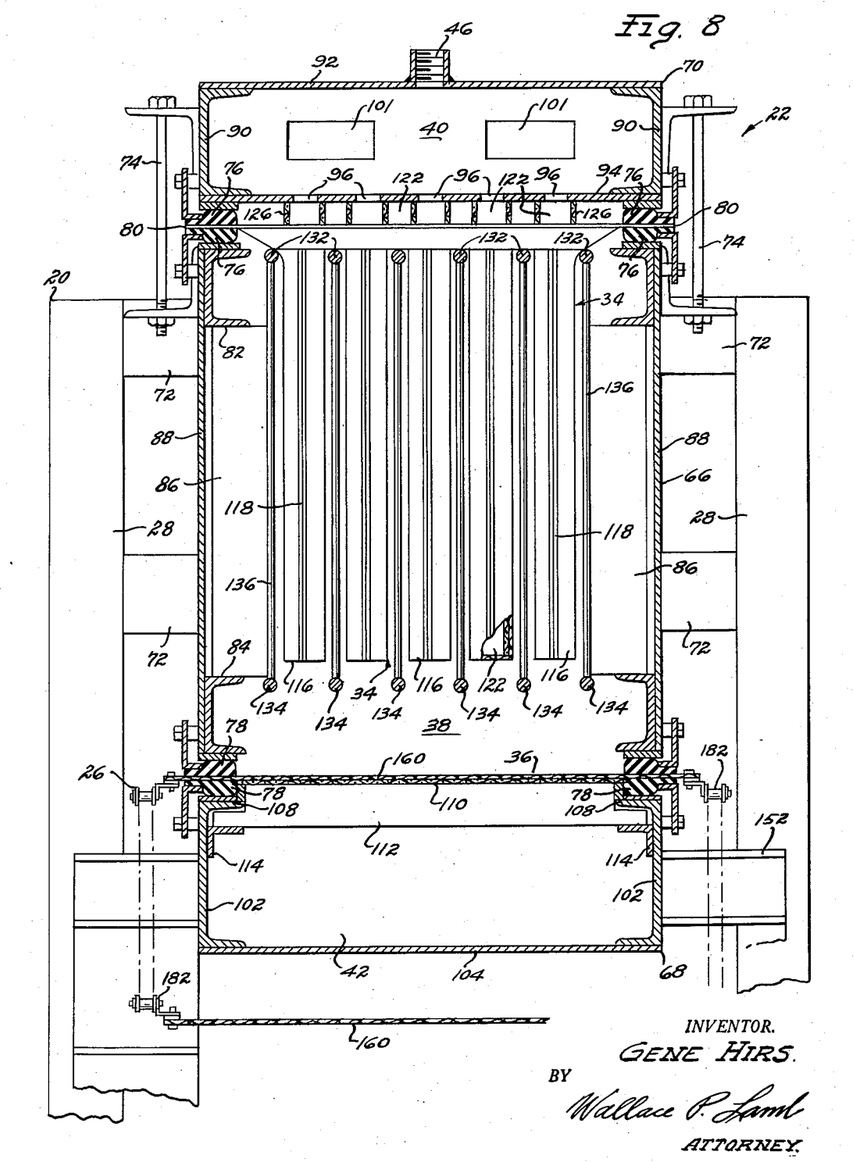
Fig. 8 is a vertical sectional view, taken along line 8—8 of Fig. 6.
Figure 9:
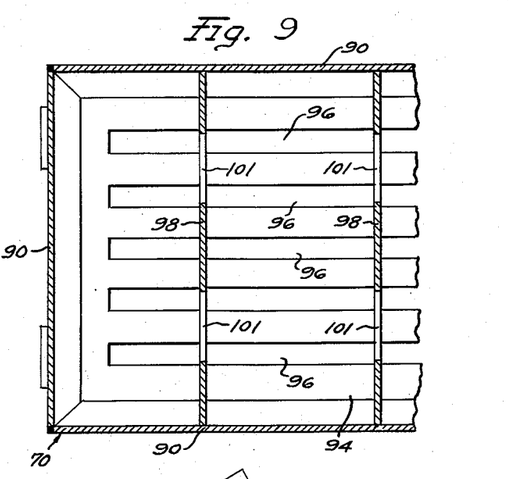
Fig. 9 is a fragmentary horizontal sectional view, taken along line 9—9 of Fig. 6.
Figures 10, 11:
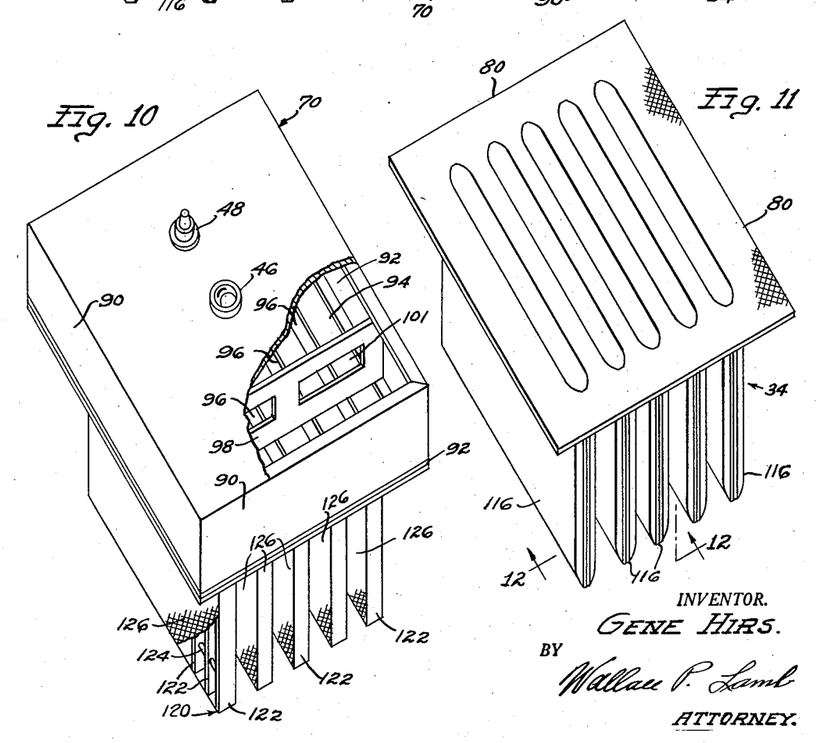
Fig. 10 is an isometric view of a unit of a filter head of my apparatus.
Fig. 11 is an isometric view of a unique filter medium of the apparatus.
Figure 12:
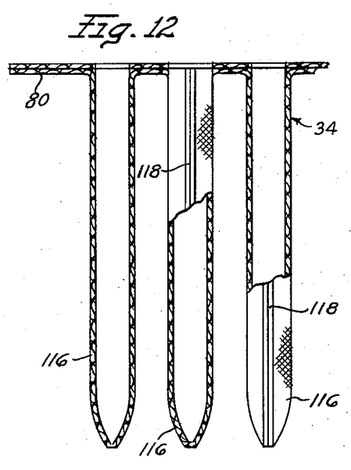
Fig. 12 is a fragmentary vertical sectional view, taken along line 12—12 of Fig. 11.

To hold the bags 116 open against pressure of the fluid, I provide a plurality of grille or grate-like forms 120 which respectively position within the bags 116 holding the bags against collapsing and in spaced relation. The forms 120 are carried by the manifold 70 to facilitate assembly and depend therefrom into the filter chamber 38. Preferably the forms 120 are made of a plurality of upright horizontally spaced rectangular plates 122 that are aligned and connected together by spaced horizontal rods 124 welded thereto. Secured to the upright edges of the plates 122 is screening 126 to give support to opposite sides of bags 116. As shown in Fig. 8, the screening 126 and plates 122 extend up to the manifold plate 94 to which the plates are preferably welded as indicated, in Fig. 6.

On reverse flow of fluid through the head to clean filter medium 34, the bags 116 have a tendency to expand laterally into engagement with each other which decreases the cleaning effect, and to avoid this I provide a plurality of separators or grille-like spacers 130. These are flat upright separators that are horizontally spaced and arranged such that they position on opposite sides of each bag 116 in close proximity thereto, as illustrated in Fig. 8. The separators 130 may each comprise an upper horizontal rod 132, a lower horizontal rod 134, and a plurality of spaced vertical rods 136 welded together. These separators 130 are positioned within shell 66 with the upper rods 132 and lower rods 134 secured at opposite ends thereof to opposite side walls of the shells, such as by welding. The upper rods 132 also function to support the bags 116 adjacent the flange 80 and the filter medium portions between the bags.

The movable shell 68 is normally held in the closed position shown by a suitable power element, such as the air cylinder and piston designated 140. Air cylinder 140 is of the well known double acting type controlled by a solenoid 142. A conduit 144 connects the air inlet of solenoid 142 to a source of compressed air and outlets from the solenoid are connected respectively to opposite ends of the cylinder by conduits 146 and 148. Normally, i.e., during filtering operation, solenoid 142 is deenergized and is biased to a position in which air pressure is acting against the lower end of the cylinder piston to hold the filter head closed. The air cylinder piston includes the usual connecting rod 150 which in this instance is connected to shell 68 by a special yoke connection 152 that is designed to clear the conveyor such that the conveyor passes freely between the yoke arms. Connecting the outlet 50 of the movable shell 68 is a flexible conduit 154 which returns the liquid to tank 52 to avoid liquid loss during the cleaning operation of the filter head. In addition, loss of liquid by separation of shells 66 and 68 is avoided by providing a drip pan 156 beneath the filter head and conveyor to return the liquid through a drain pipe 158 back to tank 52.

The conveyor 26 includes a belt 160 to support and feed the filter paper to the filter head, and an electric motor 162 to drive the belt. An endless type belt is used and has an upper lead side that extends between the separable shells 66 and 68 and a follower side that extends below shell 68. One end of the conveyor, as at 164, is the feed or drive end and drive motor 162 is located at this end above the belt 160 on a mounting 166 that may be in turn rigidly mounted on shell 68. The conveyor 26 has the usual drive shaft 167 and driven shaft 168 arranged in horizontal spaced relation. Drive shaft 167 is rotatably supported in mountings 170 which are supported on horizontal supports 172 that are rigidly secured to the standard uprights 28. Similarly, at the feed end of the conveyor, the driven shaft 168 is rotatably supported in mountings 174 on horizontal supports 176 that extend from and are rigidly secured to the uprights 28. On the shafts 167 and 168 are spools 178 and 180 respectively around which the belt 160 travels connected to endless driving chains 182 that travel about sprockets 184 on shafts 167, 168.

Figure 1:
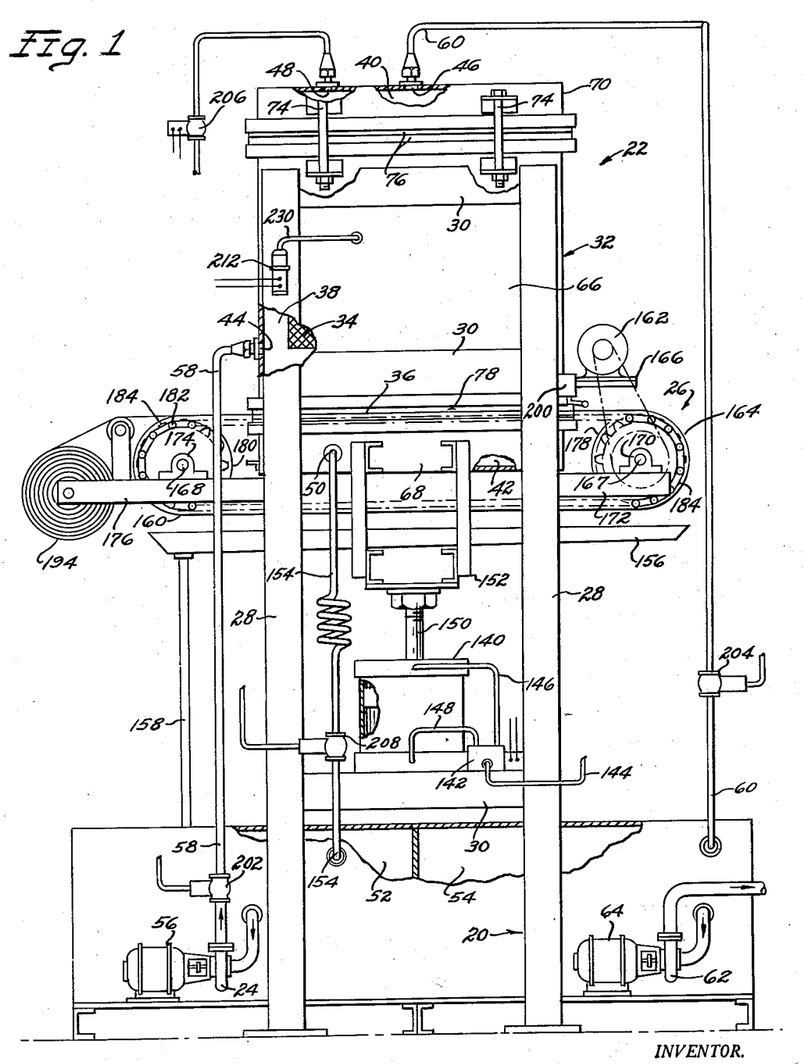
Fig. 1 is an elevational view of a fluid filtering apparatus embodying features of my invention.
Figure 2:
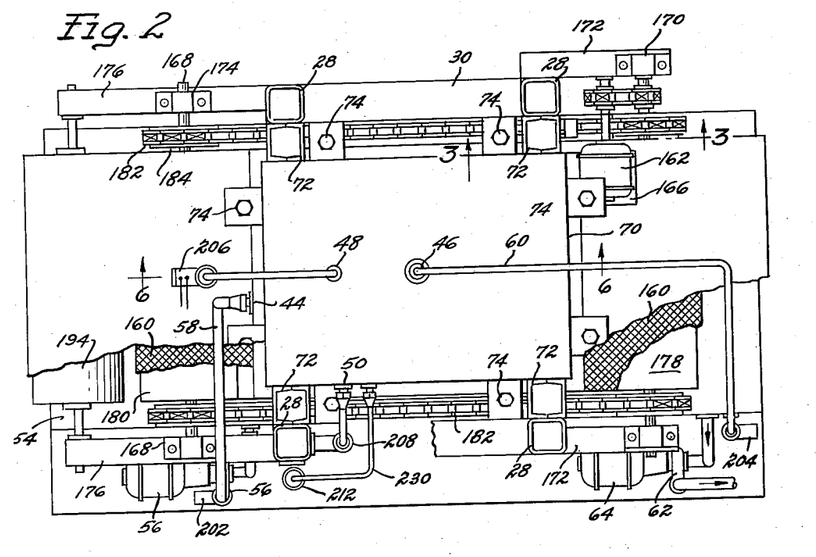
Fig. 2 is a plan view of the filter apparatus.
Figure 3:
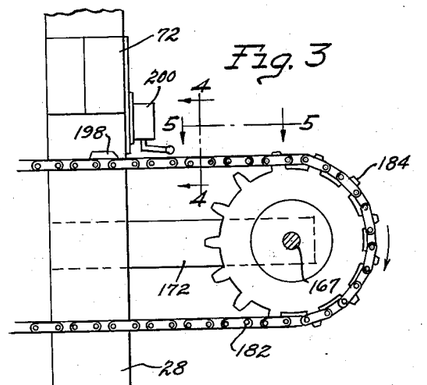
Fig. 3 is an enlarged fragmentary elevational view, taken along line 3—3 of Fig. 2.
Figure 4:
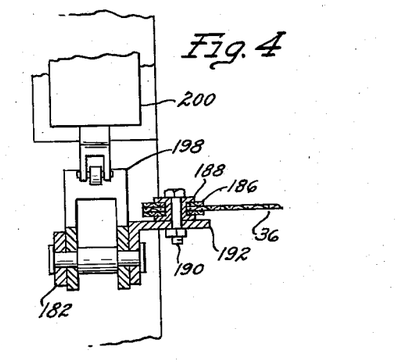
Fig. 4 is a sectional view, taken along line 4—4 of Fig. 3.
Figure 5:
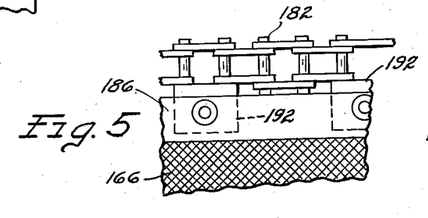
Fig. 5 is a fragmentary plan view, taken in the direction of the arrows 5—5 of Fig. 3.

The belt 160 is, of course, pervious to liquid to allow passage thereof to the lower shell 68 and may be made of any suitably strong material such as a plastic material that can be woven, knitted or otherwise fabricated to provide a fine netting that will suitably support the filter paper. Opposite edges of the belt 160 are preferably bound and reinforced by double thicknesses of a closely woven fabric, such as canvas strips 186 sewn to the belt. At spaced intervals along their lengths, the binding strips 186 are provided with eyelets 188 to receive bolts 190 for attaching the belt 160 to the chains 182 which, as shown, are laterally positioned to opposite edges of the belt. As is shown more clearly in Figs. 4 and 5, the chains 182 have spaced links that are provided with inturned tabs 192 to which the belts 190 attach the belt 160 to the chains for travel therewith.

Mounted on the conveyor supports 176, at the feed end of the conveyor, is a roll 194 of the filter paper or media arranged such that the paper will feed onto the upper or lead side of the belt 160. During filtering operation, the belt 160 and filter paper within the head 70 are held tightly between the head gaskets 78 of the separable shells 66 and 68 to filter the liquid within the head on reverse flow cleaning operation of filter medium 34. After the cleaning operation, the shells 66 and 68 are separated and the conveyor operates to move the filter paper and consequently the dirt and other foreign matter out of the head and replace the filter medium with a clean portion from roll 194. The foreign matter and used filter paper roll off the drive end of the conveyor and may be discharged into a waste container (not shown) or be disposed of in any other suitable manner.

Actuated by downwardly separating movement of shell 68 is a limit switch 196 which when closed initiates operation of the conveyor drive motor 162. Stopping of the conveyor 160 is effected by one of a number of spaced operating members or lugs 198 on one of the conveyor chains 182 engaging and actuating a limit switch 200. Thus, limit switches 196 and 200 constitute indexing controls that function to control conveyor operation such that the proper length of clean filter paper is advanced each time that replacement is required.

For the above described fluid filter, I provide a control system which is initiated in operation by a predetermined increase in fluid pressure in the filter chamber 38, to effect cleaning operation of filter 34, opening of the head, replacement of filter medium 36 and return of the apparatus to filtering operation. This system includes a valve 202 controlling fluid inlet 44, a valve 204 controlling the clean fluid outlet 46, a valve 206 controlling inlet 48 and a valve 208 controlling the fluid return outlet 50. In the present system the valves 202, 204, and 208 are conventional pressure actuated valves connected by suitable piping to the source of compressed air whereas valve 206 is a solenoid. Normally, that is during filtering operation valves 202 and 204 are open and valves 206 and 208 closed. A double acting conventional solenoid 210 controls valves 202, 204 and 208, whereas, solenoid valve 206 operates independent of solenoid 210. These solenoids 210 and 206 are normally energized so that the pressure actuated valves are in filter operation positions.

Figure 13:
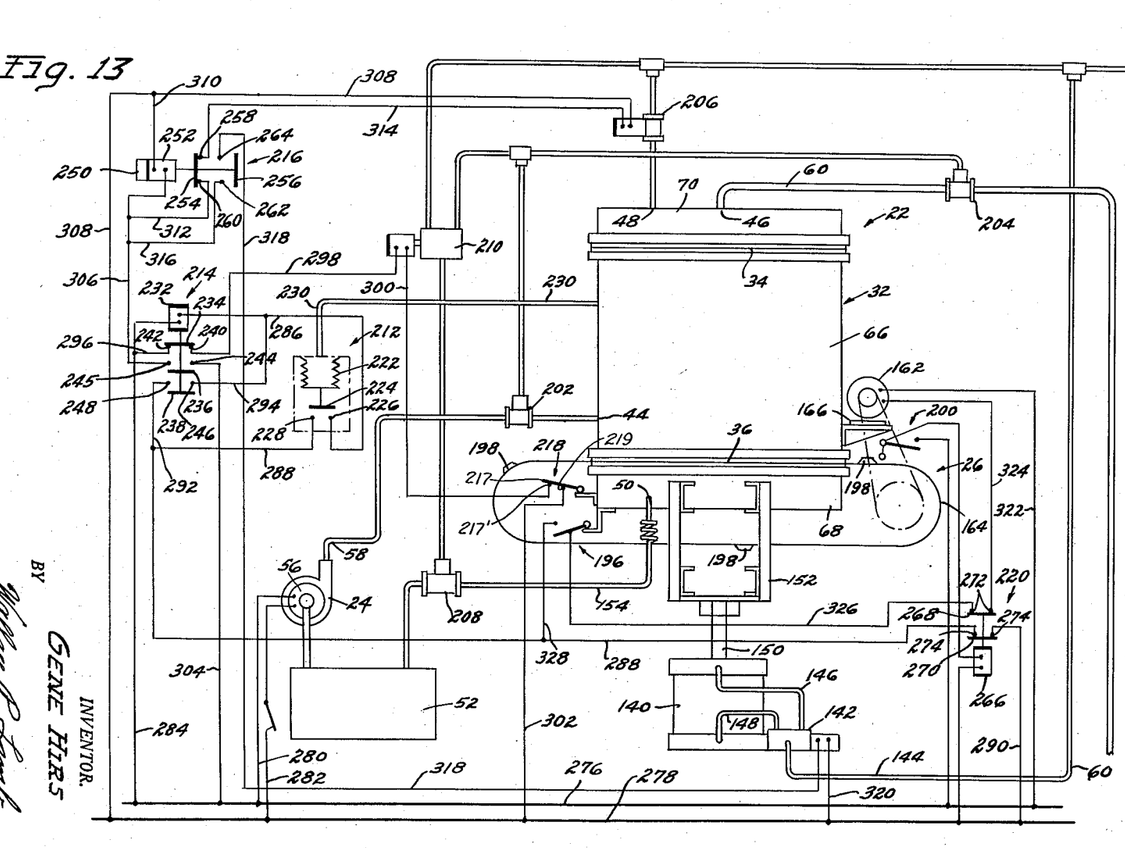
Fig. 13 is a diagrammatic view of the apparatus, its controls and circuitry.

Controlling the solenoids 210 and 206 is a pressure responsive switch 212 which is normally open and is preset to respond to a predetermined increase in pressure in filter chamber 38. In circuit with the pressure responsive switch 212 is a control relay 214 which controls several circuits including the circuit of a delayed action control or timer 216. The timer 216 is provided to delay opening of the head until the liquid has had time to drain therefrom. Further, the system includes a limit switch 218 that is actuated by movement of lower shell 68, and a double pole relay 220 controlled by the conveyor limit switch 200. Limit switch 218 is a conventional type that is diagrammatically represented as comprising an arm 217 pivoted, as at 219, and cooperable with a fixed contact 217'. The switch is biased to open position and is held closed by an abutment on lower shell 68 when the shell is in its upper or closed position as shown in Fig. 13. As shown, the limit switch 218 is in circuit with solenoid 210 so that the latter cannot be energized by the pressure actuated switch 212 unless the shell 68 is in its closed position.

The pressure responsive switch 212 is a conventional type which is diagrammatically illustrated as comprising a bellows 222 forming an expansible-contractible chamber the movable end wall of which is connected to a movable contact 224 that cooperates with a pair of fixed contacts 226 and 228. A tube 230 connects the chamber of bellows 222 to the interior of the filter head or chamber 38.

Control relay 214 comprises the usual coil 232 and an armature that carries three contacts including a normally closed contact 234 and two normally open contacts 236 and 238. Contact 234 cooperates with a pair of fixed contacts 240, 242 to control solenoid 210. Contact 236 cooperates with fixed contacts 244, 245 to control timer 216, and contact 238 cooperates with a pair of contacts 246, 248 of a holding circuit for relay coil 214.

The delayed action control or timer 216 is represented diagrammatically as a relay having a dash-pot 250 to delay operation of the armature. The timer includes the usual coil 252 and the armature carries two contacts 254 and 256. Contact 254 normally engages a pair of fixed contacts 258, 260 in controlling solenoid 206 and contact 256 is normally open and adapted to engage a pair of fixed contacts 262, 264 in controlling air cylinder 140.

Relay 220 is diagrammatically illustrated as comprising a coil 266 and an armature carrying two contacts 268 and 270. As shown, contacts 268 and 270 are normally closed and respectively bridge a pair of contacts 272 in the circuit of conveyor motor 162 and a pair of contacts 274 in the holding circuit of control relay 214.

The circuitry includes the usual main lines 276 and 278 leading from a suitable source of electric power. Pump 24 operates continuously when the filter is in use and the pump motor 56 is connected across lines 276 and 278 by a pair of leads 280, 282. A lead 284 connects one terminal of the control relay 214 to main line 276 and from the other terminal of the relay 214 a lead 286 connects to the fixed contact 226 of pressure switch 212. From the other fixed contact 228 of switch 212, a lead 288 connects to contact 274 of relay 220 and from the other of contacts 274 a lead 290 connects to main line 278. For this circuit, a holding circuit is provided by leads 292 and 294 connected to relay contacts 246, 248 and circumventing the pressure switch contacts 226, 228 so as to hold relay 214 energized when reduced pressure in the filter head causes the pressure switch 212 to open. A lead 296 from lead 284 connects to control relay contact 242 and a lead 298 from corresponding contact 240 connects to one terminal of the solenoid 210. From the other terminal of solenoid 210, a lead 300 connects to the fixed contact of limit switch 218 the movable contact of which is connected to main line 278 by a lead 302. From main lead 276, a lead 304 connects to contact 244 of control relay 214, and the other corresponding relay contact 245 is connected by a lead 306 to a terminal of timer coil 252 which in turn is connected to the other main line 278 through connecting leads 308 and 310. A lead 312, connected to lead 306 is connected to timer contact 260 and the corresponding contact 258 is connected by a lead 314 to a terminal of the solenoid 206 which has its other terminal connected to lead 308. Timer contact 262 is connected by a lead 316 to lead 306 and the corresponding timer contact 264 is connected by a lead 318 to one terminal of the air cylinder solenoid 142 which is connected to the other main line by a lead 320. From main line 278, a lead 322 connects to one terminal of conveyor motor 162 which has its other terminal connected by a lead 324 to one of the contacts 272 of relay 220. The other of the contacts 272 is connected by a lead 326 to the movable contact of limit switch 196, the fixed contact of which is connected to lead 288 by a connecting lead 328.

General operation

Assuming the apparatus to be in filtering operation, the several controls will be in the positions shown in Fig. 13. Pump 24 will be supplying contaminated fluid to filter chamber 38 under pressure above atmospheric pressure and the fluid forced through filter medium 34 will flow to the clean fluid tank 48. As filtering continues, the filter medium becomes clogged with accompanying increase in back pressure in filter chamber 38 causing pressure switch 212 to respond and close its contacts. When this occurs, filtering is stopped and a reverse flow of fluid in the head aided by the introduction thereinto of compressed air at inlet 48 is effected to clean foreign matter from filter medium 34. The fluid flows through the lower filter medium 36 depositing the foreign matter thereon, the fluid discharging from outlet 50 and draining back to tank 52 for recirculation. After a time interval calculated to require evacuation of fluid from the head, the timer 216 actuates and the air cylinder 140 then opens the filter head 32 by moving shell 68 downward. Final opening movement of shell 68 initiates operation of the conveyor 26 which carries the foreign material out of the filter head and at the same time replaces the filter medium 36. The conveyor is stopped after the filter medium 36 is replaced which is followed by the closing of shell 68 and return of the apparatus to filtering operation.

Detail operation

When the pressure in the filter head chamber 38 increases to a predetermined pressure, pressure switch 212 responds to the increased pressure and bridges contacts 226, 228 closing the following circuit of control relay coil 232: From main line 276 through lead 284, coil 232, lead 286, contacts 226, 228, lead 288, relay contacts 274 and through lead 290 to the other main line 278. Closing of this circuit energizes relay coil 232 which breaks contacts 240 and 242 and bridges contacts 244 and 245 and also bridges contacts 246 and 248. The breaking of contacts 240 and 242 opens the circuit of the normally energized solenoid 210, the circuit when said contacts are bridged being as follows: From main line 276 through leads 284, 296, contacts 242, 240, lead 298, the coil of solenoid 210, lead 300, closed contacts of limit switch 218, and through lead 302 to the other main line 278. Also when control relay 214 is energized, the following holding circuit for the relay is closed. From main line 276, through lead 284, relay coil 232, lead 294, relay contacts 246, 248, leads 292, 288, relay contacts 274 and through lead 290 to the other main line 278. The bridging of control relay contacts 244, 245 on energization of the relay closes the following circuit to energize the timer 216: From main line 276 through lead 304, contacts 244, 245, lead 306, timer coil 252, lead 310 and through lead 308 to the other main line 278. Also when control relay contacts 244 and 245 are bridged the following circuit is completed to the solenoid 206: From the main line 276, through lead 304, contacts 244, 245, leads 306, 312, timer contacts 260, 258, lead 314, the coil of solenoid 206 and through lead 308 to the other main line 278. Thus when the pressure responsive switch 212 closes, solenoid 210 is deenergized and solenoid 206 and timer 216 are energized. When solenoid 210 is deenergized it operates to effect closing of valves 202 and 204 to stop the filtering operation through filter medium 34 and effects opening of the outlet valve 208 so that fluid can flow from the filter head back to tank 52. At the same time, solenoid valve 206 opens to allow introduction of compressed air into the top of the filter head manifold 70. The compressed air aids evacuation of the head which being counter to normal flow forces the fluid in the manifold 70 back through the filter medium 34 dislodging foreign matter therefrom and depositing the foreign matter on the lower filter medium 36. When all of the fluid has been evacuated from the filter head, timer 216 breaks contacts 258, 260 allowing solenoids 206 to close and bridges contacts 262, 264. The bridging of contacts 262, 264 completes the following circuit of the air cylinder solenoid 142. From main line 276 through lead 304, control relay contacts 244, 245, leads 306, and 316, contacts 362, 364, lead 318, the coil of solenoid 142 and through lead 320 to the other main line 278. Closing of this circuit results in the air cylinder moving the lower shell 68 down away from shell 66 and releases the conveyor belt and filter paper from the head. On downward movement of shell 68, limit switch 218 opens and limit switch 196 closes. The opening of limit switch 218 insures that filtering will not begin while the head is open. Closing of limit switch 196 on opening movement of shell 68 completes the following circuit to the conveyor motor 162. From main line 276 through lead 322, motor 162, lead 324, relay contacts 272, lead 326, the now closed limit switch 196, leads 328, 288, relay contacts 274 and through lead 290 to the other main line 278. When this circuit is closed, the conveyor 26 operates and when the foreign matter has been removed from the head and filter medium 36 replaced, one of the lugs 198 on the conveyor chain closes limit switch 200 which energizes relay coil 266. This causes contacts 272 to be broken to stop the conveyor 26 which then breaks the circuit as lug passes limit switch 200. The brief opening of contacts 274 breaks the holding circuit of control relay 214 returning it to the normal position shown which in turn causes the timer 216 to return to the position shown which actuates the solenoid 142 to effect closing of shell 68. On closing, the shell 68 opens the limit switch 196 and closes the limit switch 218. Closing of limit switch energizes the solenoid 210 which then closes outlet valve 208 and opens valves 202 and 204 to resume the filtering operation.

In summation, it will now be appreciated that I have provided a new and improved automatically controlled fluid filter apparatus in which cleaning of a filter medium is automatically initiated in response to a clogging condition of the medium and the apparatus returned to filtering operation. Also, I have provided a new and improved filter having two filter mediums one of which normally filters contaminated fluid and the other of which filters the cleaning fluid that is forced through the first filter in reverse direction. Furthermore, I have provided for filters having periodic reverse fluid flow through a filter medium to clean the same, a new and improved filter head construction. In addition, I have provided a new and improved multiple bag type filter to achieve both fine filtering and large filtering capacity as compared to the flow capacity of the filter head.

While I have shown and described my invention in considerable detail, it is to be understood that my invention is to be limited only by the spirit and scope of the appended claims.

What I claim is:

1. In a filtering apparatus, supporting means, a head having two separable sections, one of said sections having an inlet for fluid to be filtered and an outlet for clean fluid and the other of said sections having an outlet, a filter medium within said one section between said inlet and said first outlet, means delivering fluid to be filtered to said inlet and maintaining the fluid pressure within said head above atmospheric pressure, a normally open valve controlling said inlet, a normally open valve controlling said first outlet, said valves responsive to a predetermined increase in fluid pressure within said head to close said inlet and first outlet, a normally closed valve controlling said second outlet and responsive to said increase in pressure to open said second outlet, an inlet to said one section on the outlet side of said filter medium to introduce a fluid under pressure into said one section, a normally closed valve controlling said second outlet and responsive to said increase in fluid pressure, said valves on responding to said increase in fluid pressure operating to reverse flow through and clean said filter medium, a delayed action control responsive to said increase in pressure and operable to return said valves to their normal positions, a filter media strip passing between said sections to filter the foreign matter cleaned from said first filter, said filter media strip being movable laterally to the direction of separation movement of said sections when said sections are separated to remove the foreign matter from said head and replace the filter portion, a power element operable to separate said sections and controlled by said delayed action control, means operable to move said filter media strip and controlled by separation movement of said sections, and means controlling the return of said valves to their normal position and operated by closing of said sections.

2. In a liquid filter apparatus, supporting means, a filter head having a bottom section movable downwardly away from the head proper and having an inlet for liquid to be filtered and an outlet for the filtered liquid, a filter medium within said head between said inlet and said outlet, a pump connected to said inlet to supply liquid to be filtered to said head and operable to maintain the liquid under greater than atmospheric pressure to force the liquid through said medium and out of said outlet, a normally open valve controlling said inlet, a normally open valve controlling said outlet, an outlet from said head on the same side of said medium as said inlet, a normally closed valve controlling said second outlet, a control operatively connected to said valves responsive to a predetermined increase in liquid pressure within said head to close the normally open valves and open the normally closed valve, an inlet in said head on the same side of said filter medium as said first outlet, means to introduce air under pressure into the head through said second inlet to evacuate the liquid when the first inlet and outlet are closed, a normally closed valve controlling said second inlet and opened by and upon response of said control to said increase in pressure, a timer controlling said second normally closed valve and controlled by said pressure responsive control, power means operable to move said bottom section downwardly away from the head proper and operatively connected to and controlled by said timer, a normally inactive conveyor carried by said bottom section and passable between said bottom section and head proper to convey filtered out foreign matter from said bottom section, and a control operatively connected to said conveyor and activated by the downward movement of said bottom section.

3. In a liquid filter apparatus, supporting means, a pair of separable casing sections, a filter medium within one of said sections dividing the interior of the said one section into an inlet chamber for liquid to be filtered and an outlet chamber for filtered liquid, said inlet chamber having a liquid inlet and said outlet chamber having a liquid outlet and an air inlet, said other section having a liquid outlet, a normally open valve controlling said liquid inlet, a normally open valve controlling said first liquid outlet, a normally closed valve controlling said second outlet, a normally closed valve controlling said air inlet, a second and movable filter medium interposed between said sections in spaced relation to said first filter medium, said second filter medium movable to remove foreign matter externally of the sections when said sections are separated, power means operable to move said second medium, a control responsive to a predetermined increase in pressure in said inlet chamber to close said normally open valves and open said normally closed valves to effect the forcing by air pressure of the liquid trapped in said outlet chamber through the first filter medium into the inlet chamber and evacuate all of the liquid from the second outlet, a timer energized by said control responding to the increased pressure to close said air valve after a preselected interval, a power element operable to separate said sections and energized by said timer following closing of said air valve, a control operable by separation of said sections to energize said power means, and a second control actuated by and upon separation of said sections to render said pressure responsive control ineffective while the sections are separated.

4. In a liquid filter apparatus, supporting means, a pair of separable sections including an upper section and a downwardly movable lower section forming a casing, one of said pair of sections having an inlet for liquid to be filtered and an outlet for the filtered liquid and the other of said pair of sections having an outlet for unfiltered liquid, a plurality of filter elements within said upper section and in communication with said outlet, said upper section having an air inlet, a normally open valve controlling said first outlet, a normally closed valve controlling said second outlet, a normally closed valve controlling said air inlet, foreign matter disposal means carried by said lower section and guided to pass between said sections to remove the foreign matter therefrom, power means operable to drive said disposal means, a control responsive to a predetermined increase in pressure in said container to close said normally open valves and open said normally closed valves to effect the evacuation by air pressure of the unfiltered liquid within said container from said second outlet, a timer energized by said control responding to the increased pressure to close said air valve after a preselected interval, a power element operable to separate said sections and energized by said timer following the closing of said air valve, a control operable by the separation movement of said sections to energize said power means, and a second control actuated by and upon separation of said sections to render said pressure responsive control ineffective while the sections are separated.

References Cited in the file of this patent
UNITED STATES PATENTS

| | | |
|---|---|---|
| 920,909 | Brewer | May 11, 1909 |
| 1,654,839 | Scoville | Jan. 3, 1928 |
| 2,366,903 | Harms | Jan. 9, 1945 |
| 2,494,534 | Armstrong et al. | Jan. 17, 1950 |

OTHER REFERENCES

Bruins et al.: Abstract of application Serial Number 770,212, published September 2, 1952, 662, O.G. 292.